United States Patent
Meng

(10) Patent No.: US 10,615,920 B2
(45) Date of Patent: Apr. 7, 2020

(54) METHOD AND APPARATUS FOR REDUCING HARQ FEEDBACK LATENCY

(71) Applicant: HTC Corporation, Taoyuan (TW)

(72) Inventor: Ling-San Meng, Taoyuan (TW)

(73) Assignee: HTC Corporation, Taoyuan (TW)

( * ) Notice: Subject to any disclaimer, the term of this patent is extended or adjusted under 35 U.S.C. 154(b) by 136 days.

(21) Appl. No.: 15/657,212

(22) Filed: Jul. 24, 2017

(65) Prior Publication Data

US 2018/0026755 A1  Jan. 25, 2018

Related U.S. Application Data

(60) Provisional application No. 62/366,088, filed on Jul. 24, 2016.

(51) Int. Cl.
| | |
|---|---|
| *H04L 1/18* | (2006.01) |
| *H04W 72/04* | (2009.01) |
| *H04L 5/00* | (2006.01) |
| *H04L 1/00* | (2006.01) |

(52) U.S. Cl.
CPC .......... *H04L 1/1812* (2013.01); *H04L 1/0036* (2013.01); *H04L 1/0052* (2013.01); *H04L 1/1822* (2013.01); *H04L 1/1829* (2013.01); *H04L 1/1861* (2013.01); *H04L 5/0005* (2013.01); *H04L 5/006* (2013.01); *H04L 5/0055* (2013.01); *H04W 72/0406* (2013.01)

(58) Field of Classification Search
None
See application file for complete search history.

(56) References Cited

U.S. PATENT DOCUMENTS

| | | | |
|---|---|---|---|
| 2005/0135253 A1* | 6/2005 | Cai | H04L 1/0003 370/236 |
| 2011/0138245 A1* | 6/2011 | Haustein | H04L 1/1819 714/748 |
| 2012/0210196 A1* | 8/2012 | Sze Yuen Lo | H03M 13/2933 714/786 |
| 2014/0247782 A1* | 9/2014 | Arambepola | H04L 1/004 370/329 |
| 2016/0128091 A1* | 5/2016 | Azarian Yazdi | H04L 1/20 370/329 |
| 2016/0128092 A1* | 5/2016 | Azarian Yazdi | H04L 5/0055 370/329 |
| 2017/0111919 A1* | 4/2017 | Madan | H04W 72/1273 |
| 2017/0111926 A1* | 4/2017 | Madan | H04W 72/1273 |
| 2017/0272201 A1* | 9/2017 | Arambepola | H04L 1/004 |
| 2019/0036663 A1* | 1/2019 | Azarian Yazdi | H04L 5/0048 |

* cited by examiner

*Primary Examiner* — Ayaz R Sheikh
*Assistant Examiner* — Faiyazkhan Ghafoerkhan
(74) *Attorney, Agent, or Firm* — Winston Hsu

(57) ABSTRACT

A method for use in a wireless communication device for controlling hybrid automatic repeat request (HARQ) process includes: determining a prediction of decoding result of a received data block based on at least signal strength of at least one of the received data block, a received control block, and a received reference signal; and sending a HARQ feedback message to another wireless communication device from which the received data block is transmitted according to the prediction decoding result.

8 Claims, 8 Drawing Sheets

METHOD AND APPARATUS FOR REDUCING HARQ FEEDBACK LATENCY

CROSS REFERENCE TO RELATED APPLICATIONS

This application claims the benefit of U.S. Provisional Application No. 62/366,088, filed on Jul. 24, 2016. The entire contents of the related applications are incorporated herein by reference.

BACKGROUND OF THE INVENTION

1. Field of the Invention

The present invention relates to an apparatus, a method, and a computer program product related to HARQ process control. More particularly, the present invention relates to an apparatus, a method, and a computer program product related to HARQ process control based on a prediction of decoding result.

2. Description of the Prior Art

Packet data latency is one of performance metrics that vendors, operators and also end-users (via speed test applications) regularly measure. Latency measurements are done in all phases of a radio access network system lifetime, when verifying a new software release or system component, when deploying a system and when the system is in commercial operation. Better latency than previous generations of 3GPP RATs was one performance metric that guided the design of long term evolution (LTE)/LTE-A. LTE is also now recognized by the end-users to be a system that provides faster access to internet and lower data latencies than previous generations of mobile radio technologies. To build an even more efficient system with reduced latency, the design for the basic frame structure in LTE systems has to be revisited. For example, a 1-ms transmission time interval (TTI) for LTE systems was determined way back in release 8, and has not changed ever since. For normal CP, a 1-ms TTI contains 14 OFDM symbols. The basic scheduling unit (SU) in LTE with normal CP is 14 OFDM symbols and 12 subcarriers. To reduce latency, a shorted TTI, such as 7, 3, or 1 OFDM symbols, can be envisioned. Also for the 5G new ratio system, ultra-reliable and low-latency communications (URLLC) has been identified as one of the major scenarios together with enhanced mobile broadband (eMBB) and massive machine-type communications (mMTC). Achieving low latency has been set as one of the major target right at the outset for 5G new radio.

Hybrid automatic repeat request (HARQ) is an essential physical layer transmission technique in modern communication systems, where retransmissions are requested by the receiver by sending a HARQ feedback message in the case of decoding failure. The HARQ feedback message can be as simple as an acknowledgment or negative-acknowledgment (ACK/NACK) to signify whether the last decoding was successful or not. Upon receiving a NACK feedback message, the transmitter sends a retransmission, which is combined in some ways with failed previous transmissions to form a better judgment as there is still useful information embedded in previous failed transmissions.

Error control coding (ECC) is commonly applied to implement HARQ. In LTE/LTE-A, tail-biting convolutional coding (TBCC) and turbo codes with incremental redundancy (IR) are adopted. In 5G new radio, turbo codes, polar codes, as well as LDPC codes are currently under consideration. A typical DL transmission process begins with obtaining the DL channel state information (CSI) from the receiver via a feedback channel. Based on the CSI, the transmitter decides on the transmission parameters including resource and rate allocation. Due to several non-idealities such as CSI quantization error and latency, the CSI based on which the transmitter makes a scheduling decision imperfect. Upon receiving the transmission, the receiver obtains an up-to-date CSI by performing a fresh CSI estimation on the reference signals that are often transmitted along with the data. The receiver then performs demodulation and decoding with the estimated CSI.

For a block fading environment, i.e., the wireless channel state can be assumed to be unchanged for the whole transmitted block, the block error probability is determined by the chosen ECC scheme, the received signal to noise ratio (SNR), and the block length. For capacity-achieving ECC and a sufficiently long block, the error probability approaches zero very quickly if the received SNR exceeds the Shannon limit given by the channel capacity theorem. If the interference signals at the receiver side can be estimated and reconstructed, the interference signals can be cancelled from the received signals and have a small impact on the received SNR. Otherwise, the interference is usually assumed to be random, and is viewed as another noise source that is independent of both the useful signals and the thermal noise. In this case, instead of SNR, the term signal-to-interference-plus-noise ratio (SINR) is used.

To appropriately operate HARQ, the receiver has to be aware of the existence of a transmission in advance even if the transmission itself fails to be correctly decoded, so that the failed transmission can be retained and combined with the retransmissions later. In LTE/LTE-A, the enhanced Node B (eNB) issues an explicit control message, a DL grant or an UL grant, to a user equipment (UE) for a DL transmission and an UL transmission, respectively. The UE thus expects a DL transmission in a predetermined time-frequency resource, and buffers the DL transmission if it fails decoding. Similar arguments apply to UL transmissions. In LTE/LTE-A the retransmissions are also termed redundancy versions (RVs) to reflect the fact that IR is used for HARQ combining. Each RV corresponds to a different set of parity bits from the same codeword.

In LTE/LTE-A systems, synchronous HARQ is adopted for the UL. The HARQ ACK/NACK responses and retransmissions take place following a predefined timing rule. For example, in frequency division duplexing (FDD) the UL data transmission happens 4 subframes after the reception of the corresponding UL grant, and the ACK/NACK responses are transmitted 4 subframes after the UL data transmission. A retransmission, if needed, also happens 4 subframes after the associated ACK/NACK. In TDD systems the rule for HARQ timing is configuration dependent and details are included in the references. For the DL, asynchronous HARQ is adopted. The timing rules for the HARQ ACK/NACK are the same for both synchronous and asynchronous cases. The retransmission, however, can take place anytime as long as it is 4 subframes apart from the associated ACK/NACK in asynchronous HARQ. The reason that a certain fixed timing is present for the HARQ feedback message is to simplify the system design; most importantly, to reserve enough time for the receiver to process and decode the transmission and prepare a corresponding HARQ feedback message.

In view of above, it can be understood there is a fixed timing relationship between a transmission/retransmission attempt and its associated HARQ feedback message. For LTE/LTE-A, such a fixed timing is 4 subframes. This achieves reliable communications, but the latency cannot be further reduced.

SUMMARY OF THE INVENTION

To address the latency issue, it is one object of the present invention to provide, methods, apparatuses, computer program products that engage a receiver in predicting whether or not a received data block is decodable. The receiver is able to quickly predict the likelihood that the current transmission is successful or not, i.e., whether the received data block can be correctly decoded or needs to be retransmitted. Also, a HARQ feedback message will be fed back to a transmitter in order to immediately to forward a request for a retransmission in case that the current transmission is predicted to be highly likely non-decodable. By sending a HARQ feedback message before the received data block is actually decoded, the latency caused by a fixed delay (e.g. 4 subframes in LTE/LTE-A system) under a conventional HARQ scheme can be significantly reduced.

According to one embodiment of the present invention, a method for use in a wireless communication device for controlling HARQ process is provided. The method comprises: determining a prediction of decoding result of a received data block based on at least signal strength of at least one of the received data block, a received control block, and a received reference signal; and sending a HARQ feedback message to another wireless communication device from which the received data block is transmitted according to the prediction of decoding result.

According to one embodiment of the present invention, a method for use in a wireless communication device for HARQ process is provided. The method comprises: receiving a first HARQ negative acknowledgement message (HARQ NACK) that is generated according to a prediction of decoding result of a transmitted data block that is received by another wireless communication device; and scheduling retransmission of the transmitted data block in response to the first HARQ NACK.

According to one embodiment of the present invention, an apparatus for use in a wireless communication device for HARQ process is provided. The apparatus comprises: a decoding prediction component, arranged to determine a prediction of decoding result of a received data block based on at least signal strength of at least one of the received data block, a received control block, and a received reference signal; and a HARQ feedback message transmitting component, arranged to send a HARQ feedback message to another wireless communication device from which the received data block is transmitted according to the prediction of decoding result.

According to one embodiment of the present invention, an apparatus for use in a wireless communication device for HARQ process is provided. The apparatus comprises: a HARQ feedback message receiving component, arranged to receive a first HARQ negative acknowledgement message (HARQ NACK) that is generated according to a prediction of decoding result of a transmitted data block that is received by another wireless communication device; and a retransmission control component, arranged to schedule retransmission of the transmitted data block in response to the first HARQ NACK.

These and other objectives of the present invention will no doubt become obvious to those of ordinary skill in the art after reading the following detailed description of the preferred embodiment that is illustrated in the various figures and drawings.

DETAILED DESCRIPTION

General Description

Figure 1:
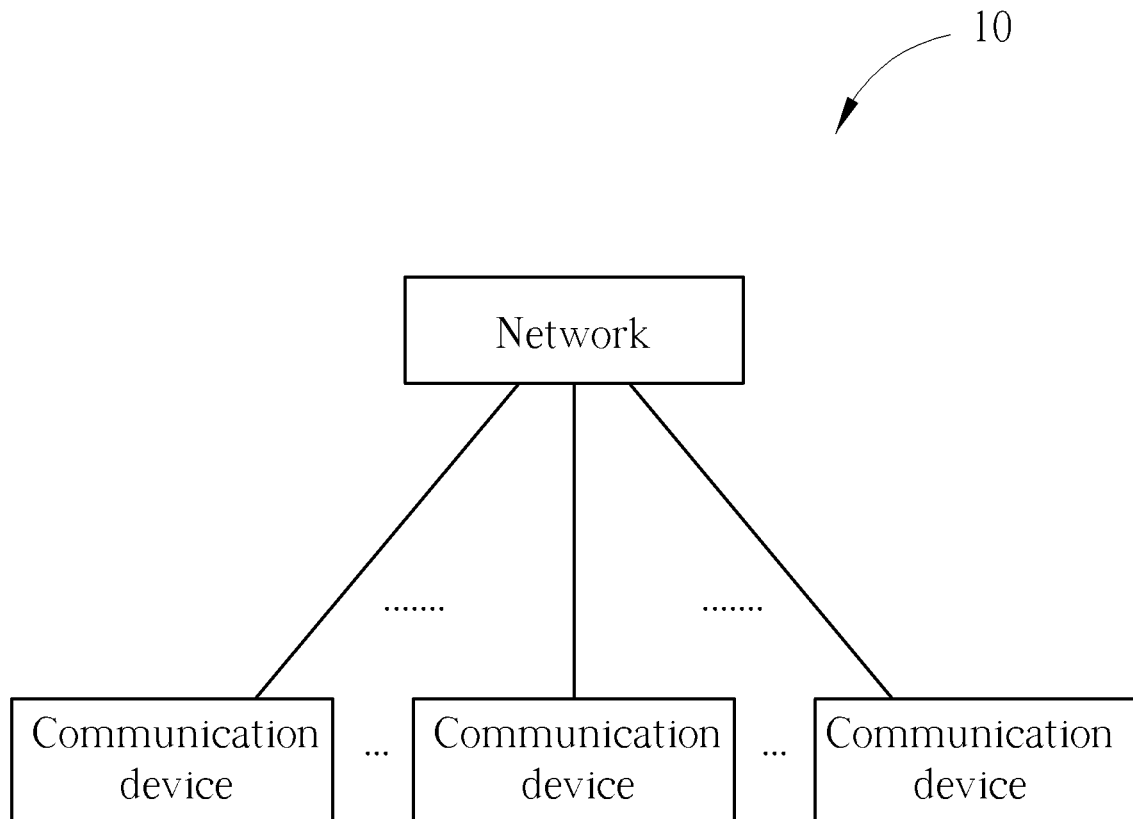
FIG. 1 is a schematic diagram of a wireless communication system 10 according to an embodiment of the present invention.

FIG. 1 is a schematic diagram of a wireless communication system 10 according to an embodiment of the present invention. The wireless communication system 10 typically comprises a network 11 and a plurality of communication devices 20. The network 11 and a communication device 20 may communicate with each other via one or more carriers of licensed band(s) and/or unlicensed band(s). In FIG. 1, the network 11 and the communication devices 20 are simply utilized for illustrating the structure of the wireless communication system 10. Practically, the network 11 may be an evolved UTRAN (E-UTRAN) including at least one evolved NB (eNB) and/or at least one relay in a long term evolution (LTE) system, a LTE-Advanced (LTE-A) system or an evolution of the LTE-A system. The eNB or the relay may be termed as a base station.

Figure 2:
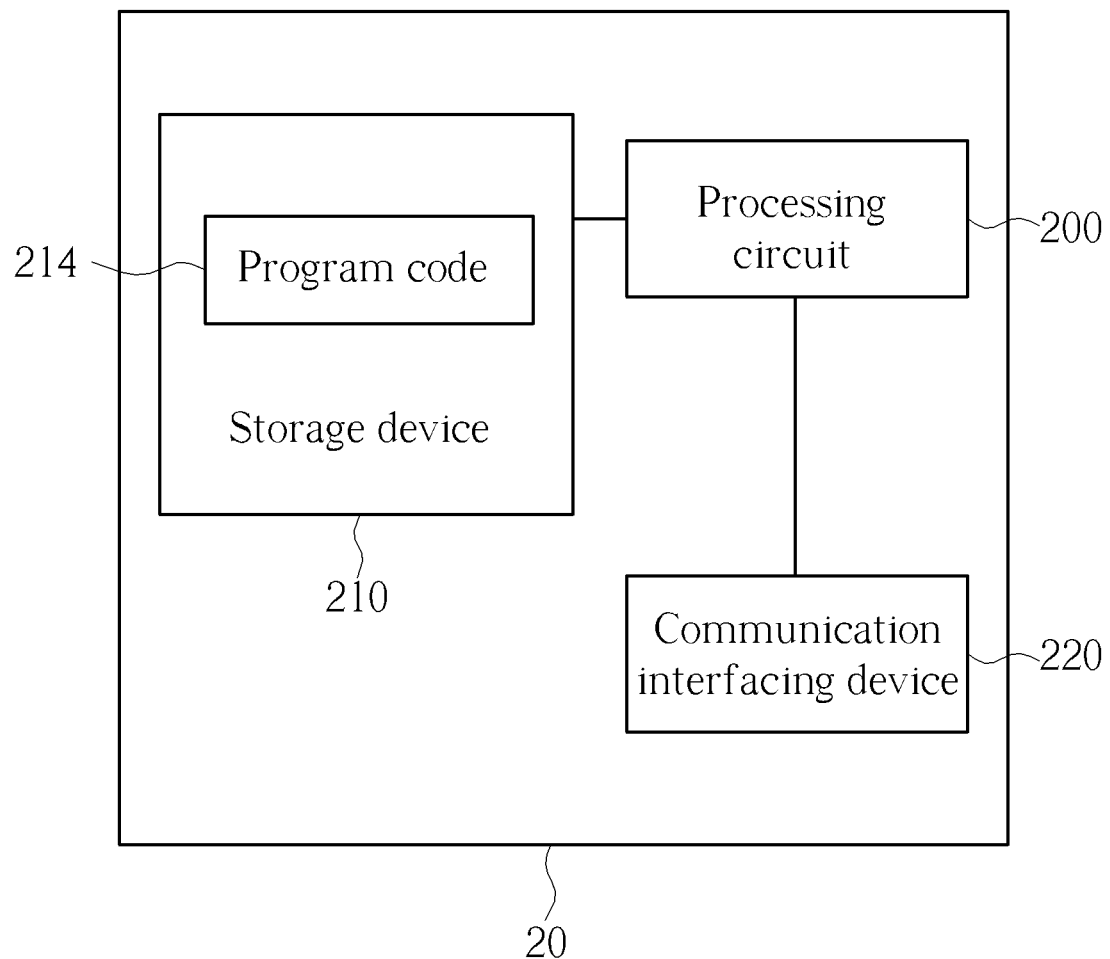
FIG. 2 is a schematic diagram of a communication device 20 according to one embodiment of the present invention.

FIG. 2 is a schematic diagram of a communication device 20 according to one embodiment of the present invention. The communication device 20 could be a UE or the network 11 shown in FIG. 1, but is not limited herein. The communication device 20 may include a processing means 200 such as a microprocessor or an Application Specific Integrated Circuit (ASIC), a storage unit 210 and a communication interfacing unit 220. The storage unit 210 may be any data storage device that can store a program code 214, accessed by the processing means 200. Examples of the storage unit 210 include but are not limited to a subscriber identity module (SIM), read-only memory (ROM), flash memory, random-access memory (RAM), hard disk, and optical data storage device. The communication interfacing unit 220 is preferably a radio transceiver, and can transmit and receive wireless signals according to processing results of the processing means 200. The program code 214 implementing any of solutions above may be stored in the storage unit 210 and executed in the processing means 200.

In the following, one of eNBs in the network 11 will be described as base station 30, while one of the communication devices 20 will be described as UE 20 for illustrative purposes.

Typically, the base station 30 transmits a DL control block and a first DL reference signal (e.g. CRS or DMRS in LTE), and a DL data block and a second DL reference signal to the UE 20. The UE 20 then estimates a first channel state information (CSI) based at least on the first DL reference signal. Based on the first CSI, the UE 20 demodulates and decodes the DL control block. The DL control block indicates a transmission format with which the DL data block is transmitted. The UE 20 then estimates signal strength based on at least one of DL control block, DL data block, the first DL reference signal, and the second DL reference signal. The UE 20 then determines if a HARQ feedback message shall be transmitted immediately to the base station 30 according to a prediction of decoding result based at least on the estimated signal strength and the transmission format of the DL data block.

Figure 3:
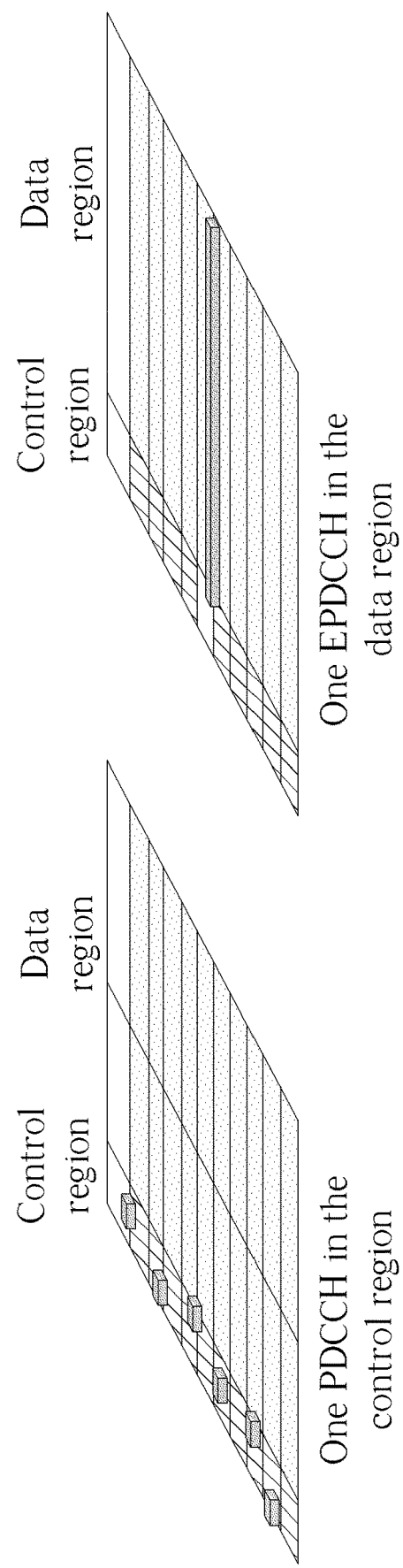
FIG. 3 illustrates a relationship between a DL reference signal and a DL control block according to one embodiment of the present invention.
Figure 4:
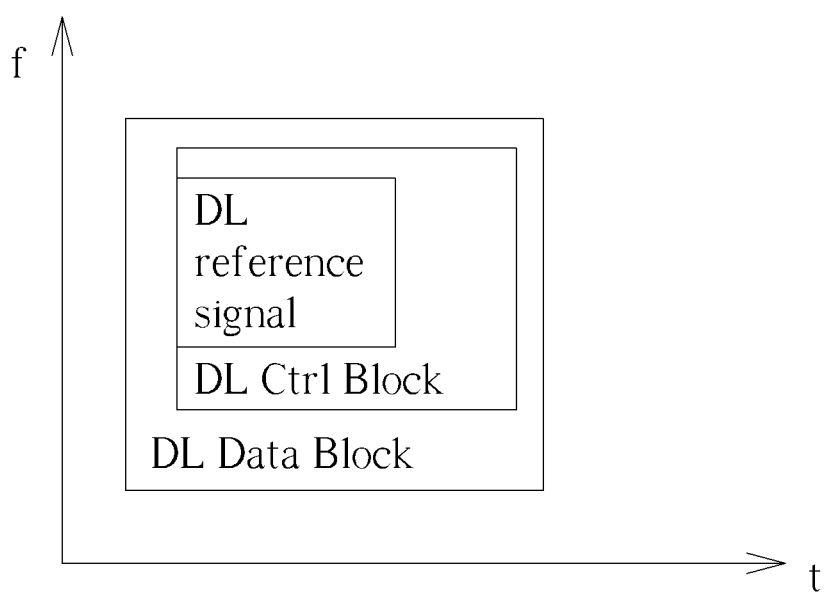
FIG. 4 illustrates a relationship between a DL reference signal and a DL control block according to another embodiment of the present invention.

In some cases, the base station 30 may not transmit the second DL reference signal. Also, it is not prohibited for the DL control block to be transmitted after or even within the DL data block in the time frequency grid. Examples of different settings are provided in FIG. 3 and FIG. 4. As illustrated by FIG. 3, for LTE/LTE-A systems, the DL control block physical downlink control channel (PDCCH) can be transmitted before the DL data block physical downlink service channel (PDSCH), each with its own reference signal CRS. This is shown in the left part of FIG. 3. Alternatively, the DL control block can also be transmitted at the same with the DL data block PDSCH, also each with its own reference signal DMRS. This is shown in the right part of FIG. 3. In FIG. 4, the DL control block is transmitted within the DL data block, sharing the same DL reference signal. Such different settings illustrated by FIG. 3 and FIG. 4 are both applicable to the present invention.

Measurement of Received SNR

In order to determine if a HARQ feedback message shall be transmitted immediately to the base station 30, the UE 20 could compute a received signal power to noise power ration (SNR) regarding the received data block, the received control block, or the received reference signal and then compare the computed received SNR to a cutoff value, thereby to perform the prediction of decoding result on the received data block.

For computing the received SNR, the noise power can be computed from summing a noise figure (NF) of the receiver components, and a thermal noise. The NF is a property of hardware components and can be known through calibration, where the NF is typically within a few dBs. The thermal noise can be computed as a product of a Boltzmannk constant, a room temperature, and a transmission bandwidth. The noise power is typically in the vicinity of around −100 dBm. For example, assuming a room temperature of 290 K, and a transmission bandwidth of 720 kHz, the thermal noise can be calculated to be −101.5 dBm. Of course this example is merely for illustrative purposes and does not limit the scope of the invention.

Furthermore, the received signal power can be estimated over the transmission time and the transmission bandwidth of the DL data block. For modern cellular communication systems, where the principle of rate adaptation is commonly adopted, base stations typically transmit with maximum transmit power. In this case, the UE 20 can also measure the received signal power using the DL control block instead of, or together with, the DL data block provided that the wireless channel state varies relatively slowly. Assuming a receiver noise power of −100 dBm, and a measured received signal power of −102 dBm, the received SNR is then −102−(−100)=−2 dB. Of course this example is merely for illustrative purposes and does not limit the scope of the invention.

Computation of Effective Value of Received SNR

If the wireless channel state and the interfering signal power between the UE 20 and the base station 30 are both constant over said transmission bandwidth, it is straightforward that the received SNR measured at any frequency within the transmission bandwidth will be the same. Normally, however, the wireless channel state will be more or less varying within the transmission bandwidth, as well as the interfering signals.

In such cases, the UE 20 needs to compute an effective value of the received SNR. The effective value of the received SNR can be interpreted as the SNR experienced by the DL data block as if the DL data block were transmitted over a flat-fading channel with constant wireless channel state and interfering signal strength. The methods for computing the effective value of the received SNR may be effective exponential SNR mapping (EESM) and mutual information effective SNR mapping (MIESM). Of course other methods are not precluded. Taking EESM as an example, the effective value "$SNR_{eff}$" of the received SNR can be computed as:

$$-\lambda * \ln(1/N * \Sigma_{i=1}^{N} \exp(-SNRi/\lambda))$$

where λ is a parameter that is empirically calibrated; N is the total number of estimated SNRi to be averaged over the transmission bandwidth. From above descriptions, the UE 20 firstly determines a plurality of individual values SNRi for received SNR, where each individual value SNRi corresponds to a physical resource block (which is intended to reflect changes of the received SNR), and then computes the effective value $SNR_{eff}$ of the received SNR according to the plurality of individual values SNRi. Please note that even though the above-mentioned technique utilizes an average value of the individual values SNRi to estimate the effective value of $SNR_{eff}$, there are still plenty of ways for computing the effective value $SNR_{eff}$ from the individual values SNRi. Furthermore, in a similar vein, an effective ratio of energy per information bit to noise power spectral density can also be computed.

After receiving a retransmitted DL control block and a retransmitted DL data block from the base station 30, the UE 20 can repeat the same procedures as described above to find an effective received SNR of the retransmitted DL data block. Accordingly, the UE 20 can compute an effective overall received SNR of the combination of the previously-received and retransmitted DL data blocks.

Estimation of Cutoff Value for Received SNR

In addition to the received SNR, the UE 20 also needs to determine a cutoff value for the received SNR for the prediction of decoding result. The cutoff value represents a value of SNR that is sufficient to correctly receive the data block under current transmission configuration. The cutoff value is determined based at least on a spectral efficiency signaled as part of the transmission format. A theoretical minimum required received SNR can be calculated for the spectral efficiency "η" by using the well-known channel capacity equation: "η=log 2(1+$SNR_{min}$)". Accordingly, the cutoff value can be set as the theoretical minimum required $SNR_{min}$, plus a DL data block-specific value. The DL data block-specific value depends at least on the property of the underlying error correct code (ECC) scheme. Said value can also be dependent on the DL data block size. For example, assuming the spectral efficiency as signaled in the transmission format is 0.7, we have theoretical minimum required $SNR_{min}$=2^0.7−1≈2 dB. This means the received SNR should at least be greater than −2 dB for the DL data block with the specified transmission format to be correctly decoded. Assuming turbo codes have been selected as the underlying ECC scheme, and the DL data block length is such that a 3 dB gap exists between the coding scheme and the theoretical limit, the cutoff value for the received SNR is then set as −2+3=1 dB, which is to say that for an estimated received SNR of −2 dB, the Data block is extremely unlikely to be correctly decoded. In a preferred embodiment, the UE 20 can obtain the cutoff value by checking a look-up table. A part of an exemplary look-up table for cutoff SNR in LTE/LTE-A systems is presented as below. The UE 20 could find the cutoff value by looking up in the table using the MCS and the number of allocated physical resource blocks (PRB) provided in the PDCCH as indices.

| MCS index | $N_{PRB}$ | |
| --- | --- | --- |
| | 49 PRB | 50 PRB |
| 0 | −10.6 dB | −10.5 dB |
| 1 | −9.6 dB | −9.5 dB |
| 2 | −8.4 dB | −8.3 dB |
| 3 | −7.4 dB | −7.3 dB |
| 4 | −6.4 dB | −6.3 dB |
| 5 | −5.2 dB | −5.1 dB |
| 6 | −4.2 dB | −4.1 dB |
| 7 | −3.2 dB | −3.1 dB |
| 8 | −2.0 dB | −1.9 dB |
| 9 | −0.8 dB | −0.7 dB |
| 10 | 0.5 dB | 0.6 dB |

Please note that the above presented part of the look-up table only shows MCS=0-10 and a number of PRB=49 and 50. This is intended for illustration purpose rather than a limitation. According to various embodiments of the present invention, a whole look-up table could record more cutoff values with respect to more MCS and more numbers of allocated PRBs indices for a better coverage.

Furthermore, after receiving a retransmitted DL control block and a retransmitted DL data block from the base station 30, the UE 20 can compute an effective overall spectral efficiency based at least on the spectral efficiencies signaled in the previously-received and retransmitted DL control blocks. Based on the effective overall spectral efficiency, an effective cutoff value can again be derived in a similar manner. Once the UE 20 measures the received SNR (or effective value), UE 20 compares it against the value provided in the table.

If the UE 20 finds that the received SNR is below the found cutoff value, which means the received data block is likely to be not decodable, the UE 20 will predict the decoding on the received block will fail. Thus, the UE 20 feeds back a HARQ NACK message to the base station 30 immediately. On the other hand, when the UE 20 finds that the received SNR is above the found cutoff value, which means the received data block is likely to be decodable, the UE 20 will predict the decoding on the received block will be successful. Thus, the UE 20 feeds back a HARQ ACK message to the base station 30 immediately.

In addition, the UE 20 can also determine if a HARQ feedback message shall be fed back immediately to the base station 30 by comparing a ratio of energy per information bit Eb to noise power spectral density N0. The ratio is related to the received SNR as "C/W*Eb/N0=SNR", where C is the transmission rate in bits per second, and W is the transmission bandwidth.

In the case where interfering signals are present, the interfering signal power can be measured and estimated by the UE 20. The abovementioned noise power is then the sum of the receiver noise figure, thermal noise, and the interfering signal power. Note that, however, if the waveform of the interfering signals can be estimated and reconstructed, the interference can be cancelled and is not of an issue.

Behaviors of UE and Base Station in Response to Prediction Decoding Result

For the UE 20, if it found the received SNR (or effective value of the received SNR) is too low, the UE 20 could decide not to decode the received data block because the UE 20 barely can successfully decode the received data block in such condition. Hence, once UE 20 finds the received SNR (or the effective value of the received SNR) is not only lower than the cutoff value but also lower than a predetermined threshold that is much lower than the cutoff value, the UE 20 will determine the received data block is not decodable and will not decode it. The UE 20 will wait a retransmitted of this data block. This is meaningful for power consumption of the UE 20.

For the base station 30, once it receives a first HARQ NACK based on a prediction of unsuccessful decoding, it immediately schedules retransmission of a data block in response to the first HARQ NACK. However, after the base station 30 has retransmitted the data block to the UE 20 and later on receives another HARQ NACK based an unsuccessful decoding attempt on the same data block (performed by a decoding component in the UE 20), which means the prediction is correct, the base station 30 will ignore the second HARQ NACK for saving the system capacity.

Furthermore, if the base station 30 receives a HARQ NACK based on a prediction of unsuccessful decoding, but later it receives a HARQ ACK based on a successful decoding attempt on the same data block (performed by a decoding component in the UE 20), which means the prediction is incorrect, the base station 30 will cancel the retransmission of the data block.

Misc

In the case where the UE 20 predicts the UL data block not decodable, i.e., the chosen metric falls below the corresponding cutoff value, the UE 20 can transmit a HARQ feedback message to request for a retransmission immediately without even actually demodulating and/or decoding the UL data block. The HARQ feedback message indicating NACK can be a pure energy in a predetermined time-frequency location known to both the base station 30 and the UE 20. The base station 30 then checks whether the UE 20 transmits a HARQ feedback message by performing energy detection on the predetermined time-frequency location. Such a time-frequency location can be implicitly derived from the transmission format of the DL control block, and/or the DL data block. For example, in LTE/LTE-A systems, control channel element (CCE) index in the DL control block is used for implicit signaling of the corresponding resource for later HARQ feedback message feedback; for UL data transmissions, the frequency position of the UL data block is used for implicit signaling of the resource used for later HARQ feedback.

Please note that the proposed solution is applicable to all cases as long as the received SNR can be measured, and the transmission format of the DL data block is known to the UE 20. The proposed solution can be directly applied to the UL direction, as all the steps involved in a DL transmission are also required in the UL. The only difference is when transmitting an UL data block and an UL reference signal, the UE might not transmit an accompanying UL control block. The reason is that the transmission format of the UL data block can be designated by the base station 30 and thus is already known to the base station 30. After receiving the UL data block and the UL reference signal, the base station 30 then applies the abovementioned procedures for estimating UL signal strength, such as, an UL received SNR, and/or an UL energy per information bit to noise power spectral density ratio. The base station 30 accordingly and immediately decides whether the UL data block is decodable by comparing the chosen metric to a cutoff value, which can also be determined in a similar way. The proposed solution can also be applied to both TDD and FDD systems.

LTE Examples

For LTE/LTE-A systems, the present invention can be applied in the following way. At first, the eNB 30 transmits a PDCCH and a PDSCH in a subframe (SF) to a UE, together with a CRS/DMRS in the PDCCH and a CRS/DMRS in the PDSCH. The UE 20 estimates a first CSI based at least on the first CRS, and demodulates and decodes the PDCCH based at least on the first CSI. Alternatively, the UE 20 estimates a first CSI based on the first CRS/DMRS and estimates a second CSI based on the second CRS/DMRS, and demodulates and decodes the PDCCH based on the first CSI and the second CSI. After decoding the PDCCH, the UE 20 understands a transmission format with which the PDSCH is transmitted. Using a MCS and a number of PRBs provided in the transmission format as indices, the UE 20 looks up in a look-up table in which a cutoff value for a received SNR is given. Based on the PDSCH, the UE 20 then estimates a received SNR at each PRB, based on which an effective received SNR is calculated using effective exponential SNR mapping (EESM). If the effective SNR is above the cutoff value given by the look-up table, the UE 20 proceeds to decode the PDSCH. Otherwise, the UE 20 transmits a HARQ NACK in a next available PUCCH with a time-frequency resource implicitly derived from a control channel element (CCE) position in the PDCCH. On the time-frequency resource for the HARQ NACK, the eNB tries to detect the presence of it. If the HARQ NACK is detected, the eNB 30 proceeds to schedule a retransmission for the UE. The HARQ timing for an FDD and TDD systems both with and without the current invention are depicted in FIG. 5 and FIG. 6, respectively.

Figure 5:
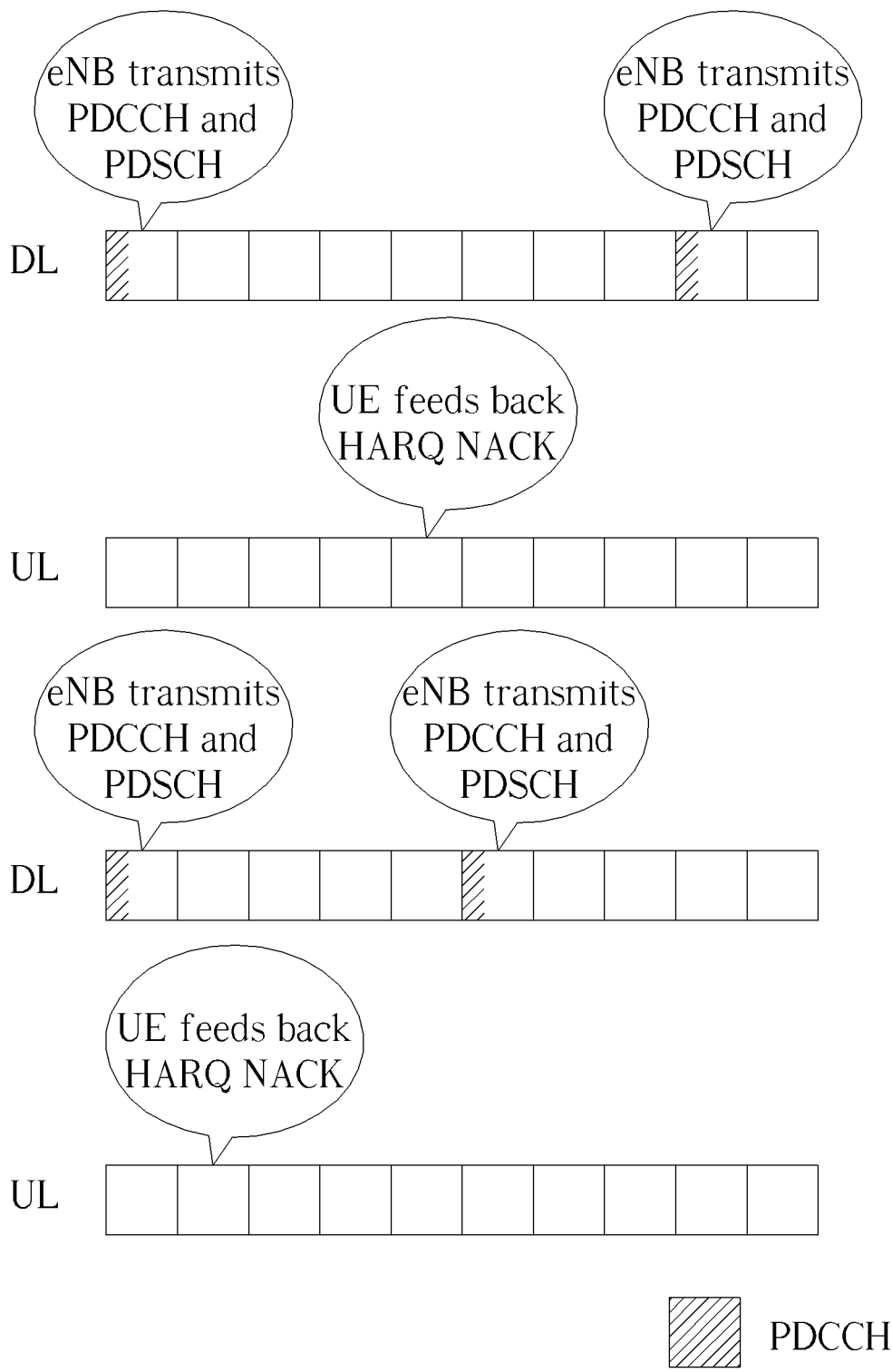
FIG. 5 illustrates differences between a conventional system and the inventive method when applied to LTE/LTE-A FDD systems according to one embodiment of the present invention.
Figure 6:
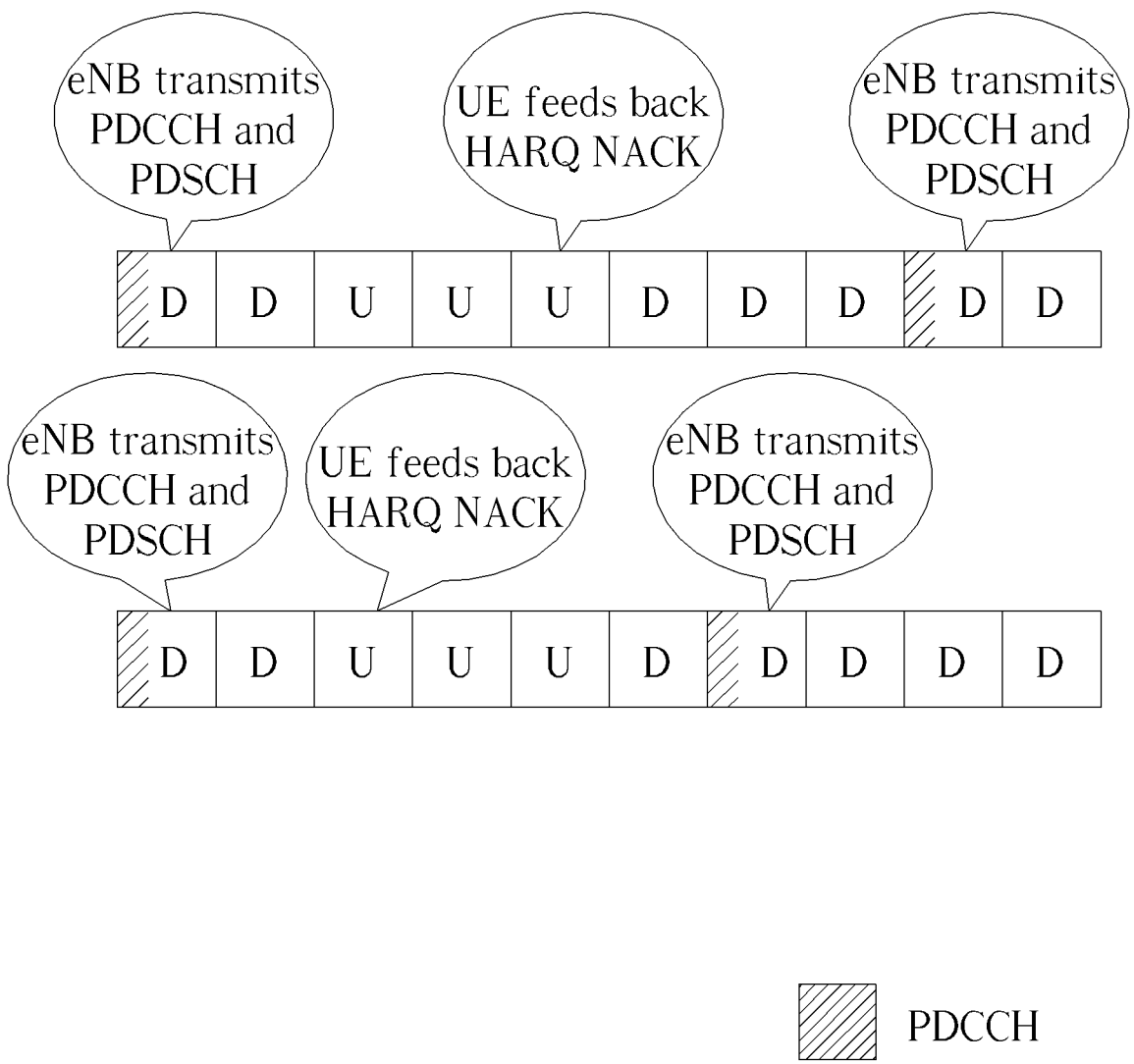
FIG. 6 illustrates differences between a conventional system and the inventive method when applied to LTE/LTE-A TDD systems according to one embodiment of the present invention.

FIG. 5 illustrates differences between a conventional system and the present invention when applied to LTE/LTE-A FDD systems. Assume that a PDCCH and a PDSCH are scheduled for a UE 20 in subframe 0 and is not decodable. In a conventional case as illustrated by part (a), the UE 20 replies a HARQ NACK message to the eNB 30 in subframe 4 and later the eNB schedules a retransmission of the PDCCH and the PDSCH in subframe 8. In an inventive case as illustrated by part (b), the UE 20 replies a HARQ NACK message to the eNB 30 in subframe 1 and later the eNB schedules a retransmission of the PDCCH and the PDSCH in subframe 5. FIG. 6 illustrates differences between a conventional system and the present invention when applied to LTE/LTE-A TDD systems. Assume that a PDCCH and a PDSCH are scheduled for a UE 20 in subframe 0 and is not decodable. In a conventional case as illustrated by part (a), the UE 20 replies a HARQ NACK message to the eNB in subframe 4 and later the eNB schedules a retransmission of the PDCCH and the PDSCH in subframe 8. In an inventive case as illustrated by part (b), the UE 20 replies a HARQ NACK message to the eNB 30 in subframe 1 and later the eNB 30 schedules a retransmission of the PDCCH and the PDSCH in subframe 5.

Method and Apparatus of the Present Invention

Based on the above description, the present invention can be summarized in following flows and implemented with following apparatuses.

Figure 7:
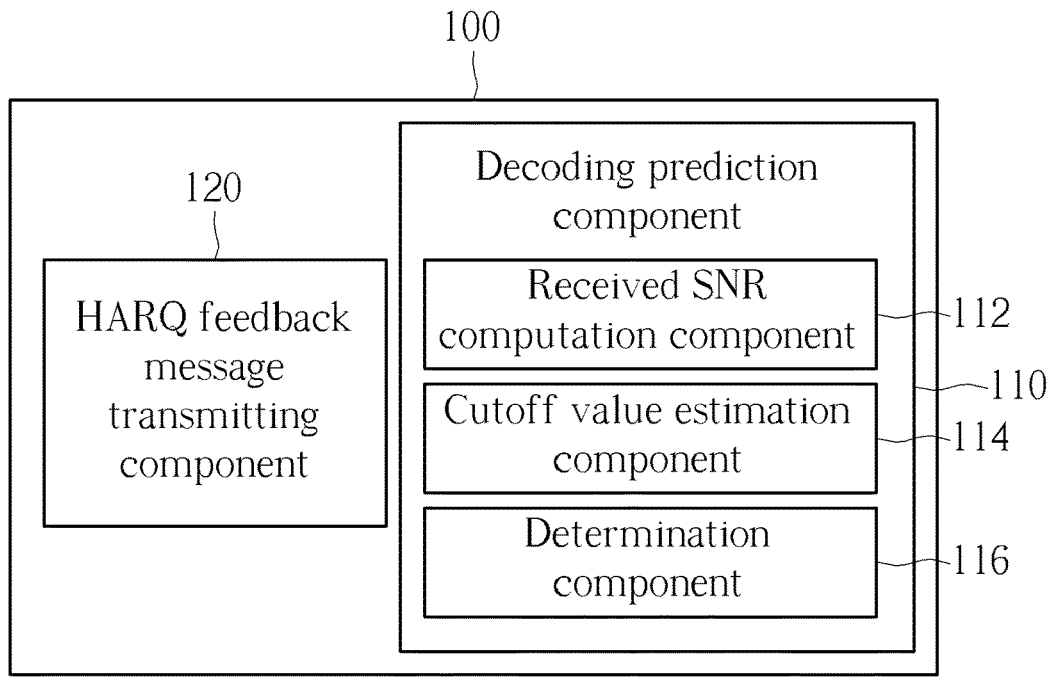
FIG. 7 illustrates a block diagram of an apparatus for use in a data block receiver according to one embodiment of the present invention.

For a data block receiver (i.e., UE 20 in a DL transmission or base station 30 in an UL transmission), it may comprise an apparatus 100 as illustrated by FIG. 7 according to one embodiment of the present invention. As shown by FIG. 7, the apparatus 100 comprises a decoding prediction component 110 and a HARQ feedback message transmitting component 120. The decoding prediction component 110 is arranged to determine a prediction of decoding result of a received data block based on at least signal strength of at least one of the received data block, a received control block, and a received reference signal. In addition, the HARQ feedback message transmitting component 120 is arranged to send a HARQ feedback message to another wireless communication device from which the received data block is transmitted according to the prediction of decoding result. Furthermore, the decoding prediction component 110 comprises: a received SNR computation component 112, a cutoff value estimation component 114 and a determination component 116. The received SNR computation component 112 is arranged to compute a received SNR (or an effective value of the received SNR) regarding the received data block. The cutoff value estimation component 114 is arranged to estimate the cutoff value for the received SNR based on at least a spectral efficiency (or an effective overall spectral efficiency). The determination component 116 is arranged to determine the prediction of decoding result by comparing the received SNR with the cutoff value.

Figure 8:
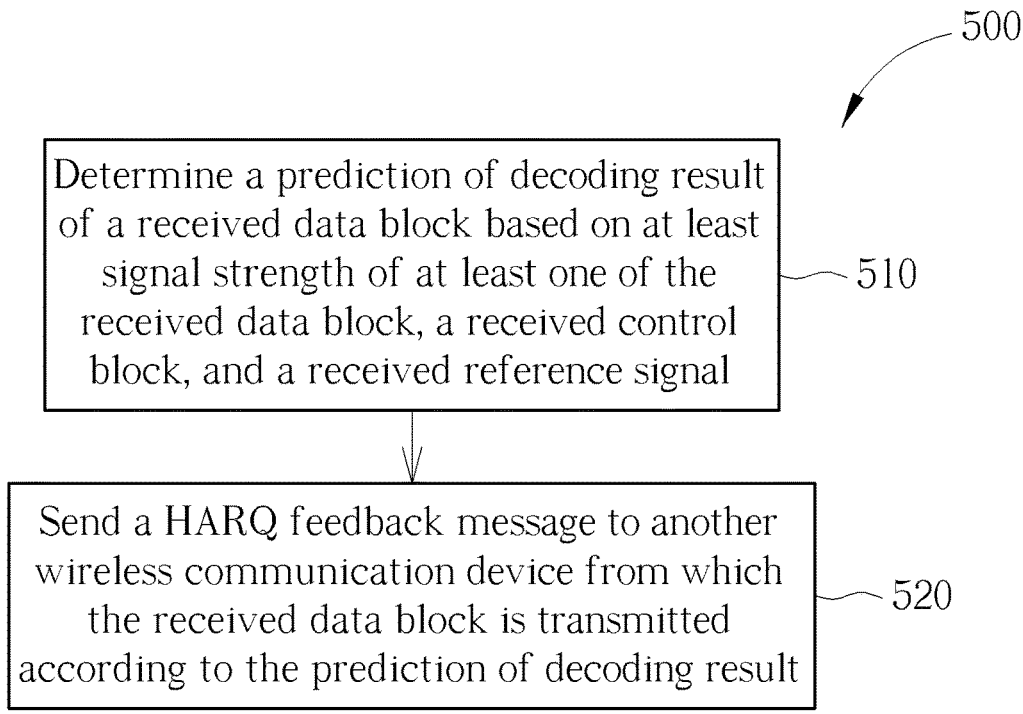
FIG. 8 illustrates a flow chart a method for use in a data block receiver according to one embodiment of the present invention.

Furthermore, the data block receiver will execute the flow as illustrated by FIG. 8, which comprises steps of:

STEP 510: Determine a prediction of decoding result of a received data block based on at least signal strength of at least one of the received data block, a received control block, and a received reference signal; and STEP 520: Send a HARQ feedback message to another wireless communication device from which the received data block is transmitted according to the prediction of decoding result.

As principles and operations of the present invention are detailed as above, further descriptions, elements, functionality and variation of combinations/sub-combinations of the steps and components of the apparatus 100 and the flow 500 are omitted here for the sake of brevity.

Figure 9:
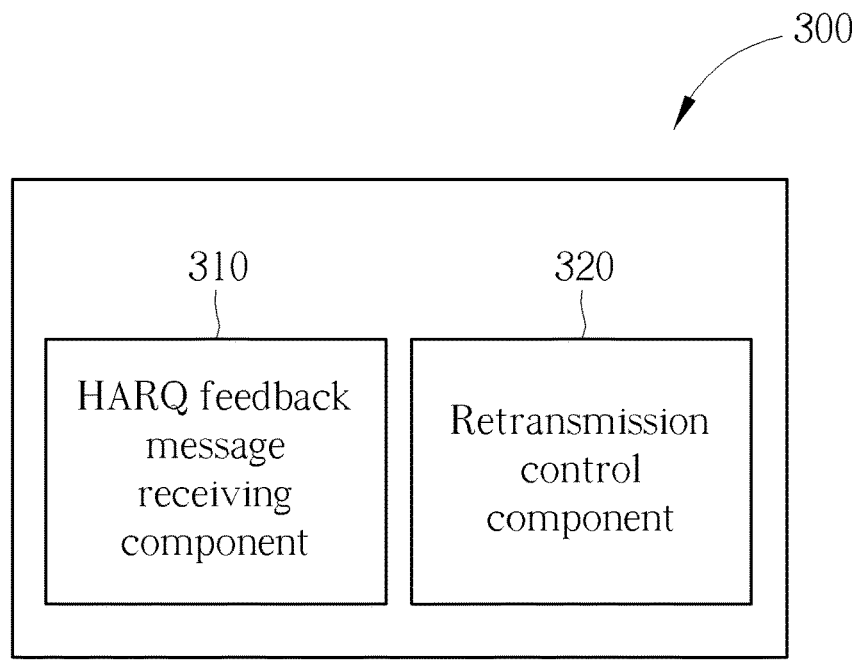
FIG. 9 illustrates a block diagram of an apparatus for use in a data block transmitter according to one embodiment of the present invention.

For a data block transmitter (i.e., UE 20 in a UL transmission or base station 30 in an DL transmission), it may comprise an apparatus 300 as illustrated by FIG. 9 according to one embodiment of the present invention. As shown by FIG. 9, the apparatus 300 comprises a HARQ feedback message receiving component 310 and a retransmission control component 320. The HARQ feedback message receiving component is arranged to receive a first HARQ NACK that is generated according to a prediction of decoding result of a transmitted data block that is received by another wireless communication device. In addition, the retransmission control component 320 is arranged to schedule retransmission of the transmitted data block in response to the first HARQ NACK.

Figure 10:
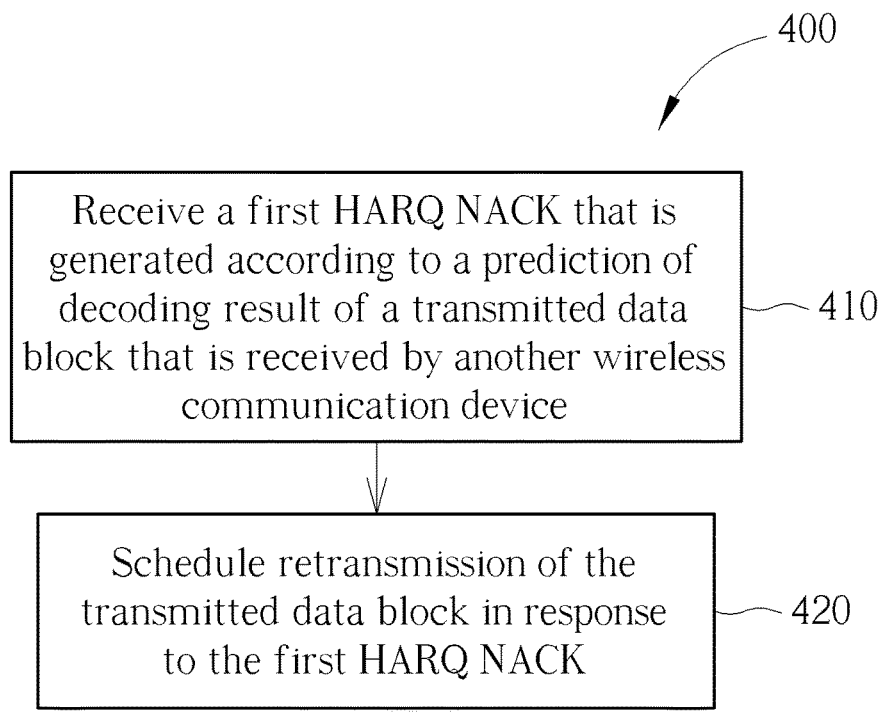
FIG. 10 illustrates a flow chart of a method for use in a data block transmitter according to one embodiment of the present invention.

Furthermore, the data block transmitter will execute the flow as illustrated by FIG. 10, which comprises steps of:

STEP 410: Receive a first HARQ NACK that is generated according to a prediction of decoding result of a transmitted data block that is received by another wireless communication device; and STEP 420: Schedule retransmission of the transmitted data block in response to the first HARQ NACK.

As principles and operations of the present invention are detailed as above, further descriptions, functionality and variation of combinations/sub-combinations of the steps and components of the apparatus 300 and the flow 400 are omitted here for the sake of brevity.

Reference throughout this specification to "one embodiment", or "an example" means that a particular feature, structure or characteristic described in connection with the embodiment or example is included in at least one embodiment of the present embodiments. Thus, appearances of the phrases "in one embodiment", "in an embodiment", "or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Additionally, any examples or illustrations given herein are not to be regarded in anyway as restrictions on, limits to, or express definitions of any term or terms with which they are utilized. Instead, these examples or illustrations are to be regarded as being described with respect to one particular embodiment and as being illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such non-limiting examples and illustrations includes, but is not limited to: "for example," "for instance," "e.g.," and "in one embodiment."

The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for use in a wireless communication device for controlling hybrid automatic repeat request (HARQ) process, comprising:
   determining a prediction of decoding result of a received data block based on at least signal strength of at least one of the received data block, a received control block, and a received reference signal, comprising:
      computing a received signal power to noise power ration (SNR) regarding the received data block, the received control block, or the received reference signal;
      estimating a cutoff value for the received SNR, comprising:
         computing a minimum required SNR according to the spectral efficiency; and
         determining the cutoff value according to the minimum SNR and a size of the received data block;
      determining the prediction of decoding result by comparing the received SNR with the cutoff value, wherein the cutoff value is estimated for the received SNR based on at least a spectral efficiency; and
   sending a HARQ feedback message to another wireless communication device from which the received data block is transmitted according to the prediction of the decoding result.

2. The method of claim 1, wherein the step of sending the HARQ feedback message according to the prediction of decoding result comprises:
   sending a HARQ negative acknowledgment message if the prediction of decoding result indicates the received data block is not decodable.

3. The method of claim 1, wherein the prediction of decoding result indicates the received data block is decodable if the received SNR is higher than the cutoff value, and the prediction of decoding result indicates the received data block is not decodable if the received SNR is lower than the cutoff value.

4. The method of claim 1, wherein the received block will not be decoded if the received SNR is lower than a predetermined threshold, where the predetermined threshold is further lower than the cutoff value.

5. The method of claim 1, further comprising:
   computing a plurality of individual values of the received SNR, each determined with respect to one of a plurality of physical resource blocks, respectively; and
   computing the effective value of the received SNR according to the plurality of individual values.

6. The method of claim 5, wherein the effective value of the received SNR is computed according to an average value of the plurality of individual values.

7. The method of claim 1, further comprising:
   computing a first value of the received SNR regarding a first transmission of the received data block, the received control block, or the received reference signal;
   computing a second value of the received SNR regarding a second transmission of the received data block, the received control block, or the received reference signal; and computing the effective value of the received SNR at least according to the first value and the second value of the received SNR;

wherein at least one of the first and the second transmissions of the received data block, the received control block, or the received reference signal is retransmission of the received data block, the received control block, or the received reference signal.

8. The method of claim 7, further comprising:

determining an effective overall spectral efficiency based at least on spectral efficiencies signaled in the first transmission and the second transmission; and estimating the cutoff value at least according to the effective overall spectral efficiency.

* * * * *